(12) United States Patent
Buck et al.

(10) Patent No.: US 10,594,007 B2
(45) Date of Patent: Mar. 17, 2020

(54) BATTERY ASSEMBLY WITH TEMPERATURE CONTROL DEVICE

(71) Applicant: ENERDEL, INC., Greenfield, IN (US)

(72) Inventors: Derrick S. Buck, Pendleton, IN (US); Robert N. Fattig, Anderson, IN (US); Bruce J. Silk, Indianapolis, IN (US)

(73) Assignee: Enerdel, Inc., Indianapolis, IN (US)

( * ) Notice: Subject to any disclaimer, the term of this patent is extended or adjusted under 35 U.S.C. 154(b) by 0 days.

(21) Appl. No.: 15/821,077

(22) Filed: Nov. 22, 2017

(65) Prior Publication Data

US 2018/0375180 A1    Dec. 27, 2018

Related U.S. Application Data

(63) Continuation of application No. 14/467,324, filed on Aug. 25, 2014, now Pat. No. 9,853,334, which is a continuation of application No. 12/741,510, filed as application No. PCT/US2008/012545 on Nov. 7, 2008, now Pat. No. 8,846,231.

(60) Provisional application No. 61/002,163, filed on Nov. 7, 2007.

(51) Int. Cl.
| | |
|---|---|
| *H01M 10/647* | (2014.01) |
| *H01M 2/10* | (2006.01) |
| *H01M 10/04* | (2006.01) |
| *H01M 10/625* | (2014.01) |
| *H01M 10/615* | (2014.01) |
| *H01M 10/6551* | (2014.01) |
| *H01M 10/6555* | (2014.01) |
| *H01M 10/655* | (2014.01) |
| *H01M 10/613* | (2014.01) |
| *H01M 10/38* | (2006.01) |
| *H01M 10/052* | (2010.01) |
| *H01M 10/656* | (2014.01) |

(52) U.S. Cl.
CPC ....... *H01M 10/647* (2015.04); *H01M 2/1072* (2013.01); *H01M 10/049* (2013.01); *H01M 10/0413* (2013.01); *H01M 10/0468* (2013.01); *H01M 10/0472* (2013.01); *H01M 10/0486* (2013.01); *H01M 10/613* (2015.04); *H01M 10/615* (2015.04); *H01M 10/625* (2015.04); *H01M 10/655* (2015.04); *H01M 10/6551* (2015.04); *H01M 10/6555* (2015.04); *H01M 10/04* (2013.01); *H01M 10/052* (2013.01); *H01M 10/38* (2013.01); *H01M 10/656* (2015.04); *H01M 2220/20* (2013.01); *Y02E 60/122* (2013.01); *Y10T 29/53135* (2015.01)

(58) Field of Classification Search
None
See application file for complete search history.

(56) References Cited

U.S. PATENT DOCUMENTS

2004/0021442 A1*  2/2004  Higashino ......... H01M 10/0413
                                                                    320/112

* cited by examiner

*Primary Examiner* — Jeremiah R Smith
(74) *Attorney, Agent, or Firm* — Faegre Baker Daniels LLP

(57) ABSTRACT

A battery module of the present invention is adaptable to be utilized in various configurations including and not limited to an overlapping battery cell packaging configuration and a vertical stack battery cell packaging configuration used in an automotive and non-automotive applications. The battery module has a plurality of battery heatsink assemblies with the cells disposed therebetween. A plurality of rods extend through the each heatsink assemblies to secure the heatsink assemblies and the cell with one another to form the battery module.

9 Claims, 7 Drawing Sheets

BATTERY ASSEMBLY WITH TEMPERATURE CONTROL DEVICE

RELATED APPLICATIONS

The present application is a continuation of U.S. patent application Ser. No. 14/467,324, filed Aug. 25, 2014, titled BATTERY ASSEMBLY WITH TEMPERATURE CONTROL DEVICE; which is a continuation of U.S. patent application Ser. No. 12/741,510, filed Aug. 13, 2010, titled BATTERY ASSEMBLY WITH TEMPERATURE CONTROL DEVICE; which is a national stage application of PCT/US08/12545, filed Nov. 7, 2008; which claims the benefit of U.S. Provisional Application Ser. No. 61/002,163, filed Nov. 7, 2007, the entire disclosures of which are expressly incorporated by reference herein.

FIELD OF THE INVENTION

The subject invention relates to battery packs having cells and more particularly, to a battery pack for electric/hybrid vehicles having a cooling system or a heating system for cooling the cells within the battery pack and method of retaining the cells within the battery pack.

BACKGROUND OF THE INVENTION

Motor vehicles, such as, for example, hybrid vehicles use multiple propulsion systems to provide motive power. This most commonly refers to gasoline-electric hybrid vehicles, which use gasoline (petrol) to power internal-combustion engines (ICEs), and electric batteries to power electric motors. These hybrid vehicles recharge their batteries by capturing kinetic energy via regenerative braking. When cruising or idling, some of the output of the combustion engine is fed to a generator (merely the electric motor(s) running in generator mode), which produces electricity to charge the batteries. This contrasts with all-electric cars which use batteries charged by an external source such as the grid, or a range extending trailer. Nearly all hybrid vehicles still require gasoline as their sole fuel source though diesel and other fuels such as ethanol or plant based oils have also seen occasional use.

Batteries and cells are important energy storage devices well known in the art. The batteries and cells typically comprise electrodes and an ion conducting electrolyte positioned therebetween. Battery packs that contain lithium ion batteries are increasingly popular with automotive applications and various commercial electronic devices because they are rechargeable and have no memory effect. Operating the lithium ion battery at an optimal operating temperature is very important to the batteries performance and lifespan.

Due to the characteristics of the lithium ion batteries, the battery pack is typically specified to operate—within an approximate ambient temperature range of −30° C. to 60° C. However, even when operating within this temperature range, the battery pack may begin to lose its capacity or ability to charge or discharge should it remain at the extremes for long periods of time. Nonetheless, it may be unavoidable that the lithium ion battery be used where the ambient temperature falls outside the temperature range.

Alluding to the above, significant temperature variances can occur from one cell to the next, which is detrimental to performance of the battery pack. To promote long life of the entire battery pack, the cells must be below a desired threshold temperature. To promote pack performance, the differential temperature between the cells in the battery pack should be minimized. However, depending on the thermal path to ambient, different cells will reach different temperatures. Further, for the same reasons, different cells reach different temperatures during the charging process. Accordingly, if one cell is at an increased temperature with respect to the other cells, its charge or discharge efficiency will be different, and, therefore, it may charge or discharge faster than the other cells. This will lead to decline in the performance of the entire pack.

The art is replete with various designs of the battery packs with cooling and packaging systems. The U.S. Pat. No. 5,071,652 to Jones et al. teaches a metal oxide-hydrogen battery including an outer pressure vessel of circular configuration that contains a plurality of circular cell modules disposed in side-by-side relations. Adjacent cell modules are separated by circular heat transfer members that transfer heat from the cell modules to the outer vessel. Each heat transfer member includes a generally flat body or fin which is disposed between adjacent cell modules. A peripheral flange is located in contact with the inner surface of the pressure vessel. The width of each cell module is greater than the length of the flange so that the flange of each heat transfer member is out of contact with the adjacent heat transfer member. The flanges are constructed and arranged to exert an outward radial force against the pressure vessel. Tie bars serve to clamp the cell modules and heat transfer members together in the form of a stack which is inserted into the pressure vessel.

The metal oxide-hydrogen battery taught by the U.S. Pat. No. 5,071,652 to Jones et al. is designed for cylindrical type of batteries and teaches the heat transfer members in direct contact with the vessel thereby failing to create a clearance between the vessel and the heat transfer members, which can be used to introduce cooling or heating agent to cool or heat the cells.

Referring now to packaging systems of the battery cells, numerous prior art references teach metallic cases used to protect the cells from handling and vibration damage and allowing for combining of multiple cases into a single large pack. However, the metallic cases are expensive to manufacture and each different configuration requires new dies to produce the various components and new tools to assemble those components. Consequently, techniques and materials for enclosing the battery cells in envelopes creating lithium battery cell packs have been developed. Unfortunately, these packages do not provide structural rigidity or protection from handling and vibration nearly as well as the metallic cases, nor can they be combined into consistently sized groups of cells because of the inherent variation in the thickness of a lithium battery cell pack.

There remains an opportunity for an improved battery pack having cell retaining elements to maintain the battery pack at the optimal operating temperature to ensure the longest possible life cycle, with rated capacity, and charge and discharge rates.

SUMMARY OF THE INVENTION

A battery module of the present invention is adaptable to be utilized in various configurations including and not limited to a horizontally or vertically stacked battery cell packaging configurations used in automotive and non-automotive applications. The battery module has a multitude of cells each adjacent to a respective heatsink-formed from thermally conductive materials such as, for example, flat stock aluminum alloy foils and the like, without limiting the scope of the present invention. Preferably, each cell is a lithium ion cell having a first current collector and a first electrode adjacent the first current collector and a second current collector and a second electrode of charge opposite from the first electrode and adjacent the second current collector. A separator layer is positioned between the first and second electrodes with the first and second electrodes conducting electrolyte therebetween. The plurality of the first electrodes and the second electrodes are stacked and packaged into an electrical insulating envelope to form a cell.

Alluding to the above, each heatsink presents a plate formed from thermally conductive materials. The plate defines thermal transfer edges and terminal ends. Each plate defines a cut out portion and a spacer engaging said cut out portions. Each plate includes a plurality of holes to receive a plurality of rods extending therethrough to interconnect the heat sinks with one another to form the battery pack. One of the terminal ends extends into a fin presenting a first configuration having a rectangular cross section. The other terminal end extends into another fin presenting a second configuration having a L-shaped cross section. The first and second cross sections are not intended to limit the scope of the present invention and are disclosed herewith for exemplary purposes. The fins may be cold formed and are designed to transfer heat either to or from the cells depending on application.

A cell retaining device is cooperable with each heat sink. The cell retaining device includes a inner frame set and a outer frame set. The inner frames of each cell retaining device sandwiches the heat sink therebetween. The inner and outer frames present a plurality of male and female connecting features that mechanically engage with one another to lock the prismatic cell within the inner and outer frames. These features can be disengaged to allow for the removal of the prismatic cell for disassembly purposes. This describes a cell retaining and heat transfer assembly A device, such as a layer of material, such as foam or any other non-rigid polymeric material, is sandwiched between the prismatic cells. The device substantially covers the prismatic cells. Each heat sink has a pair of the inner frames and is connected to the opposite sides of the heat sink and mechanically engaging the respective outer frames having the respective prismatic cells in between to form a cell retaining and heat transfer assembly. This device is sandwiched between at least two of these assemblies which are mechanically stacked and electrically connected to one another to form the battery pack. As the assemblies are combined to form the battery pack, the device allows expansion and contraction of the prismatic cells during typical charge and discharge states therefore causing the cell to maintain intimate contact with the heat sink for efficient thermal transfer.

An advantage of the present invention is to provide a battery pack having excellent retention that surrounds and secures the cells.

Another advantage of the present invention is to provide a battery pack that reduces manufacturing costs due to simplified assembly methods.

Still another advantage of the present invention is to provide a means to thermally manage the battery pack to deliver and receive high rates of current; i.e. the C-rate, by efficiently removing undesired heat during the rapid charge or discharge pulse that may negatively impact the performance and life span of the battery pack.

Still another advantage of the present invention is to provide a pack that is simple in design and has a reduced mass.

Still another advantage of the present invention is to provide a battery pack that is easily expandable for varying applications.

Still another advantage of the present invention is to provide an electrically insulating shell the surrounds the prismatic cells.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
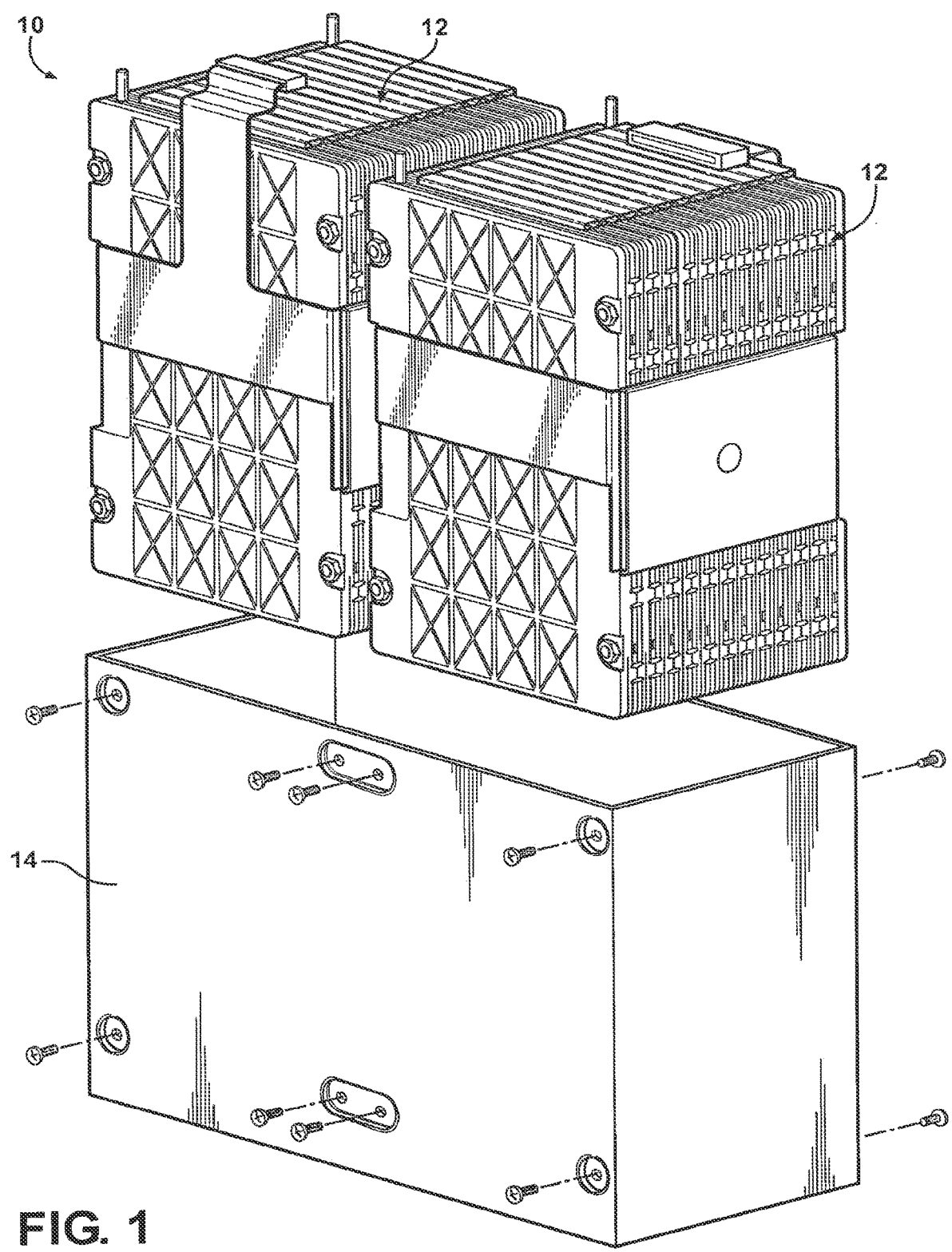
FIG. 1 illustrates a battery case having a pair of battery packs of the present invention.
Figure 2:
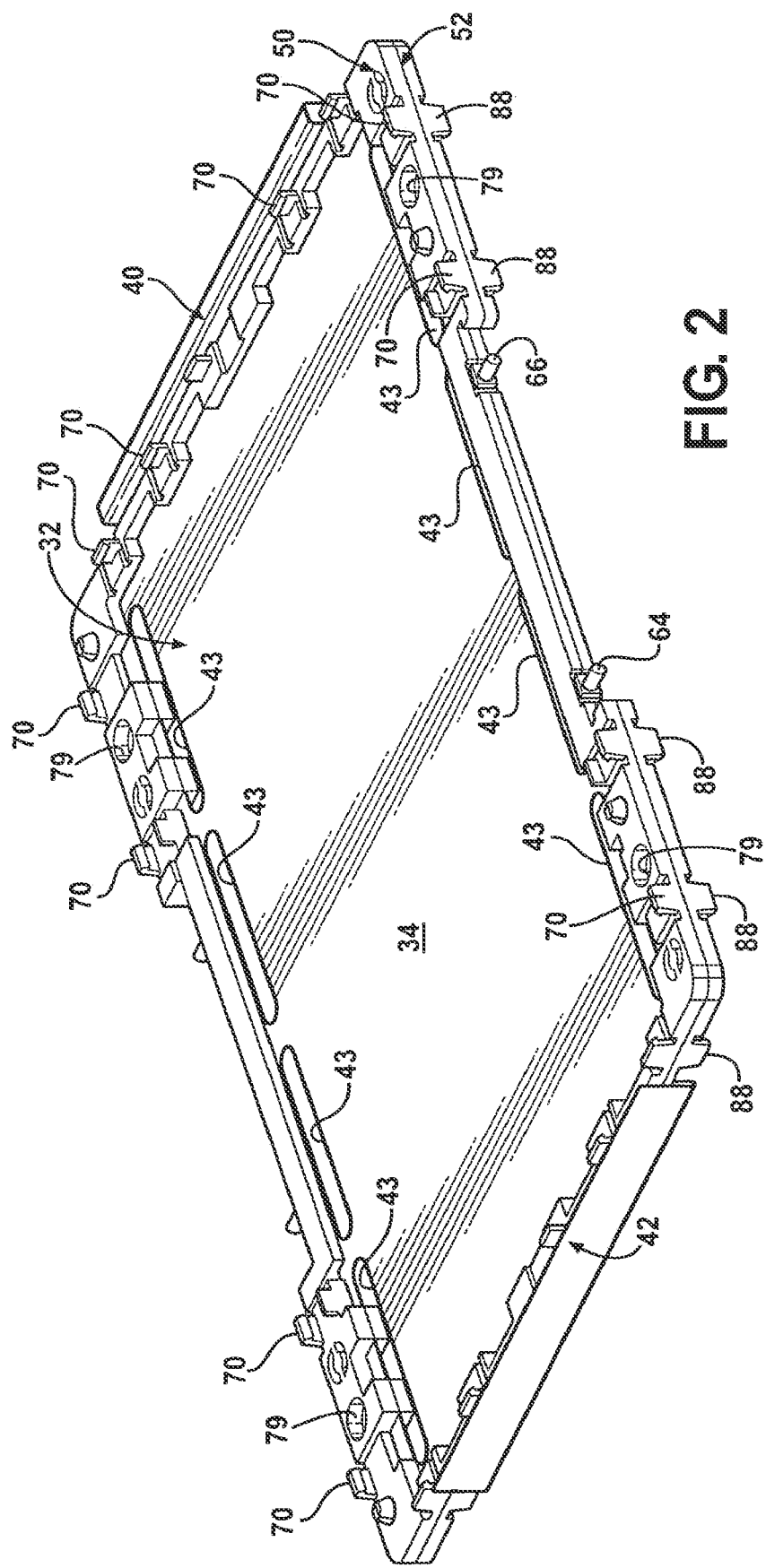
FIG. 2 illustrates a heat sink sandwiched between a pair of inner frames.
Figure 3:
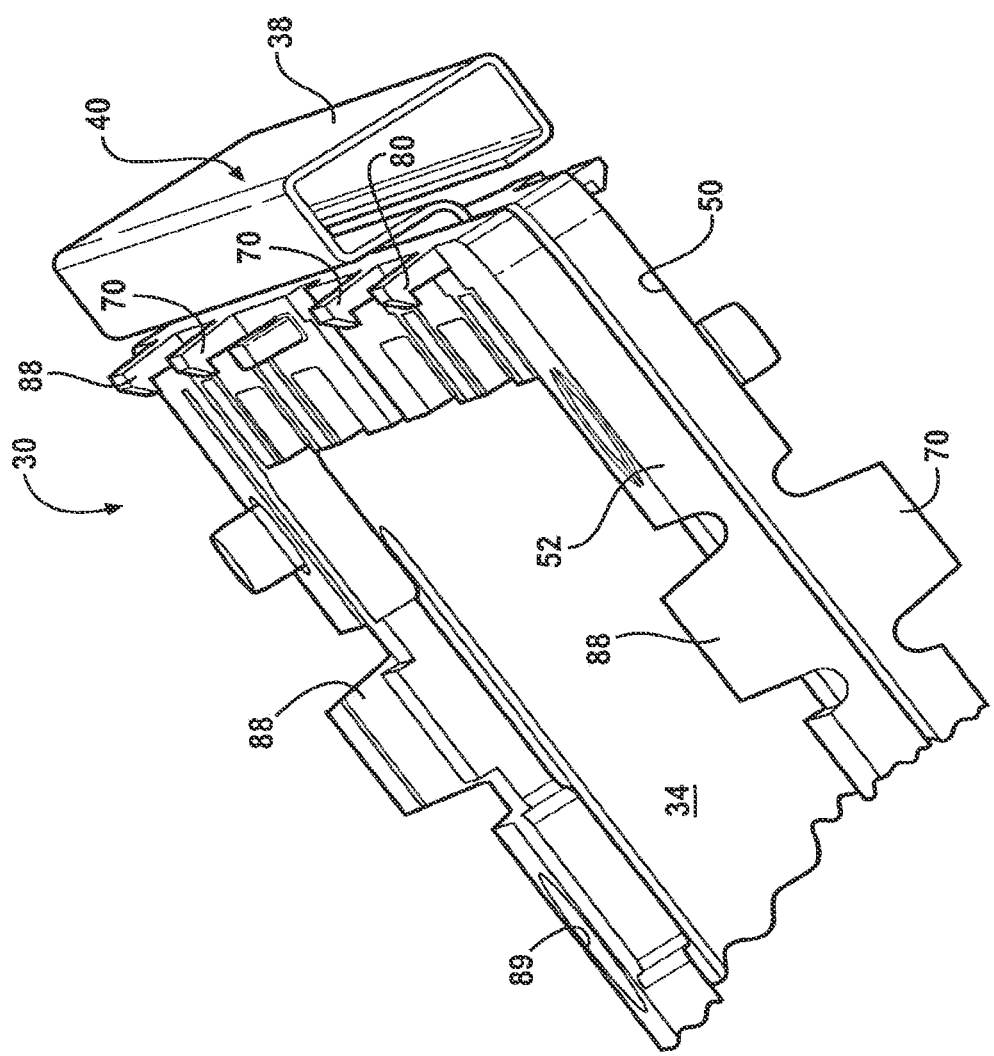
FIG. 3 illustrates a fragmental perspective view of the heat sink sandwiched between the inner frames as shown in FIG. 2.

Referring to the Figures, wherein like numerals indicate like or corresponding parts, a battery assembly of the present invention is generally indicated at 10 in FIG. 1 having a pair of battery packs, generally indicated at 12, disposed in a housing 14. The battery pack 12 is adaptable to be utilized in various configurations including and not limited to a horizontally or vertically stacked battery cell packaging configuration used in an automotive vehicle applications or non-automotive applications. Each battery pack 12 includes a plurality of cells 16. Preferably, each cell 16 is a lithium ion cell having a prismatic configuration without limiting the scope of the present invention. Those skilled in the battery art will appreciate that other cells can be utilized with the present invention. Each cell 16 includes a plurality of battery components (not shown) co-acting between one another with electrolyte therebetween as known to those skilled in the lithium battery art. A first electrode is adjacent a first current collector and a second electrode of charge opposite from the first electrode is adjacent a second current collector. A separator layer is positioned between the first and second electrodes with the first and second electrodes with electrolyte therebetween. A plurality of first electrodes and second electrodes are stacked and packaged into an electrical insulating envelope to form a cell.

Alluding to the above, each cell 16 presents side edges 18 and 20. A first terminal or first bend 22 presents a positive terminal and extends from one of the edges 18. A second terminal or bend 24 presents a negative terminal extending from the other edge 20. Each bend 22 and 24 defines an angle of at least ninety degrees. The angle may vary at its degree and may be configured to be up to ninety degrees without limiting the scope of the present invention. Alternatively, the first and second terminals may present a planar configuration. Each bend 22 and 24 presents a pair of semicircular openings 26. Alternatively, each bend may present other openings (not shown) having different configurations without limiting the scope of the present invention.

Referring now to FIGS. 2 through 6, each battery pack includes a plurality of cell retaining elements, generally shown at 30, removeably connected with one another to form the battery pack 12. FIG. 7 illustrates an exploded view of the battery pack 12 to appreciate the inventive concept. The cell retaining element 30 includes a heatsink, generally indicated at 32. The heatsink 32 presents a plate 34 formed from a thermally conductive material such as aluminum, copper, and the like, without limiting the scope of the present invention. Each heatsink 32 terminates to oppositely spaced from one another fin portions, generally indicated at 36 and 38 in FIG. 4. The fin portion 38 presents a rectangular or tubular cross section 40. The other fin portion 36 presents a flat surface 42. The fin portions 36 and 38 may include a gate shape, may be pleated, planar, may present a plurality of slots or holes, may be formed as a bend to provide a thermal interface plane for an external heating or cooling device including but not limited to heater blankets and/or cooling jackets. Those skilled in the art will appreciate that numerous other shapes of the fin portions 36 and 38 can be utilized to provide better surface area for cooling or heating media, such as liquids, solids, or gasses, and the like, are introduced to the fin portions 36 and 38 of each thermally conductive plate, sheet, or foil to either cool or to heat the cells 16. The fin portions 36 and 38 may be cold formed and are designed to transfer heat either to or from the cells depending on application. The plate 34 defines a plurality of slots 43 and semicircular configuration 44 at the sides 46 of the plate 34 to receive a plurality of rods 48 extending therethrough to interconnect the cell retaining elements 30 with one another to form the battery pack 12.

As best illustrated in FIGS. 4 through 7, a frame assembly of the cell retaining element 30 is disclosed. The frame assembly includes a first set of inner frames 50 and 52 securing the plate 34, sandwiched between the inner frames 50 and 52, and a second set of outer frames 54 and 56 for securing the cells 16. One of the cells 16 is secured between one of the inner frames 50 and one of the outer frames 54. The other inner and outer frames 52 and 56 secure another of the cells 16 retained therebetween.

Figure 4:
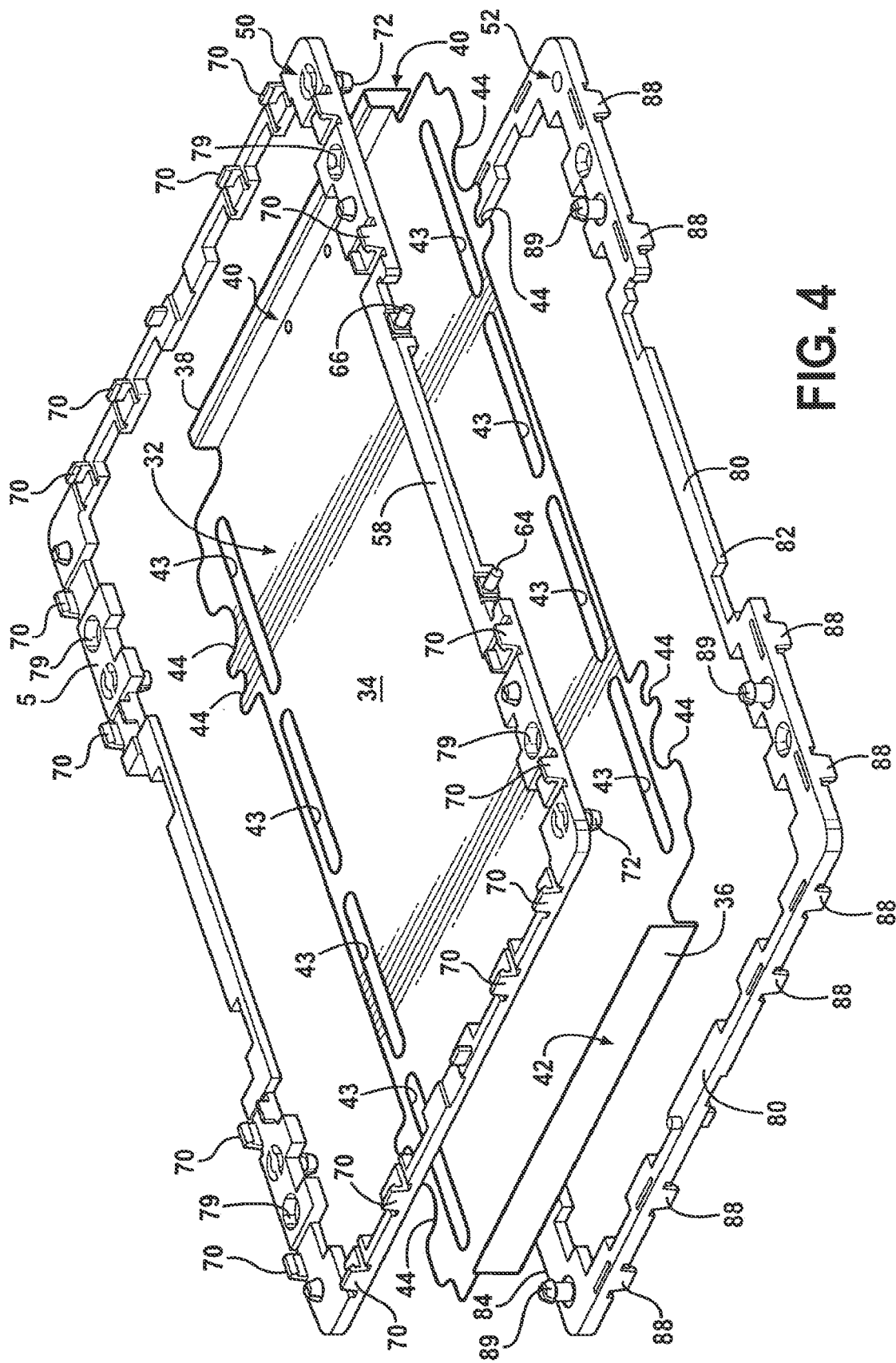
FIG. 4 illustrates an exploded view of FIG. 2.
Figure 5:
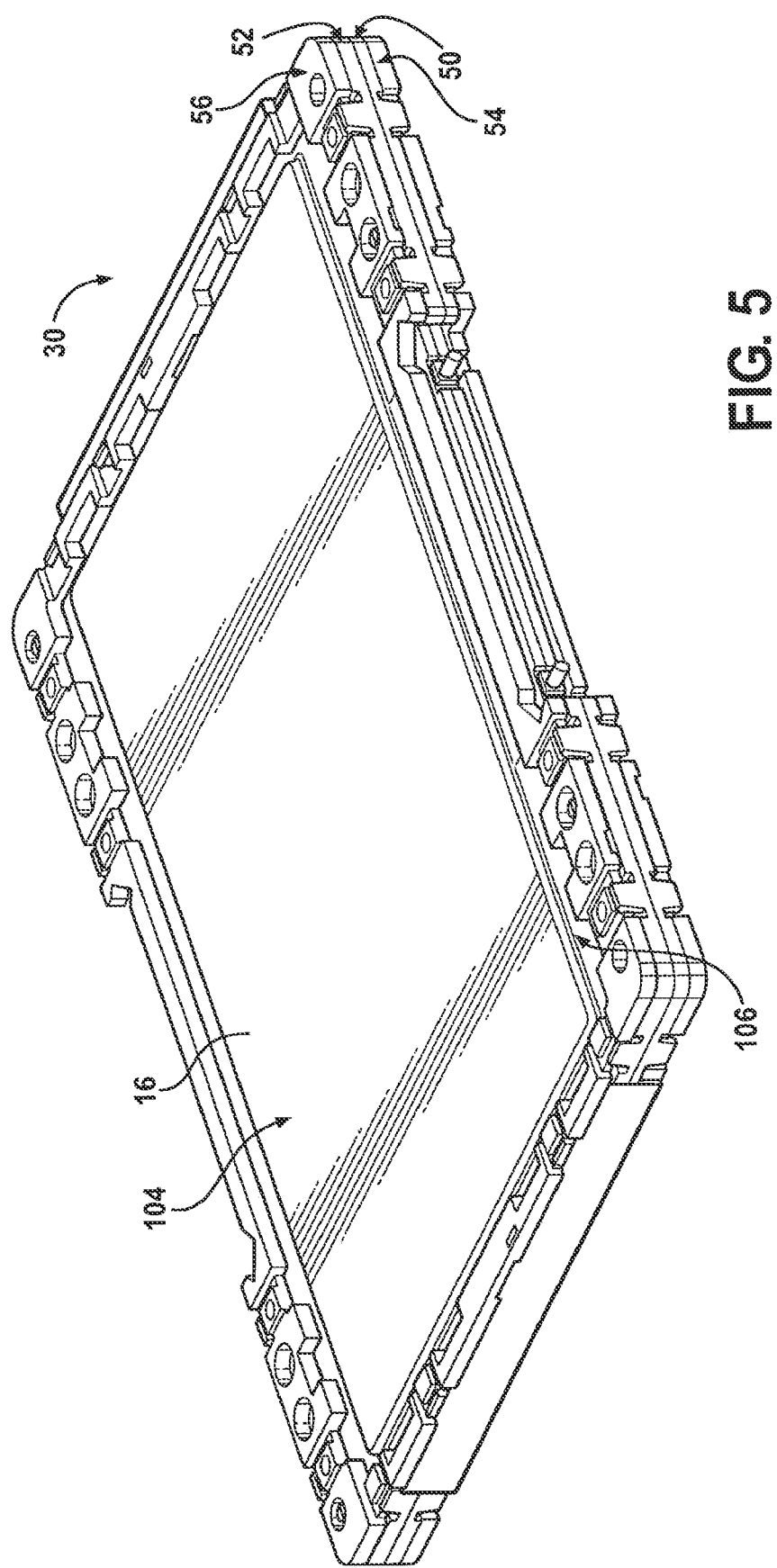
FIG. 5 illustrates a perspective view of a cell retaining element having the heat sink sandwiched between the inner frames, a pair of prismatic cells positioned on opposite sides of the heat sink with each prismatic cell extending over the respective inner frames and a pair of outer frames each extending over the respective prismatic cell.

As best shown in FIG. 4, one of the inner frames 50 presents a peripheral edge 58 and side walls 60 and 62. One of the side walls 62 includes a pair of pins 64 and 66 to electro-mechanically engage the bends 22 or 24 of the cells 16. A plurality of holes or female connectors 68 are defined in the inner frame 50. A plurality of male connectors or hooks 70 are formed and integrally extend from and about the peripheral edge 58 of the inner frame 50. The hooks 70 extend in the opposite direction and away from the plate 34. A plurality of studs 72 extend from the inner frame 50 in the direction opposite from the hooks 70 to mechanically engage another inner frame 52 and the plate 34 sandwiched therebetween.

Figure 6:
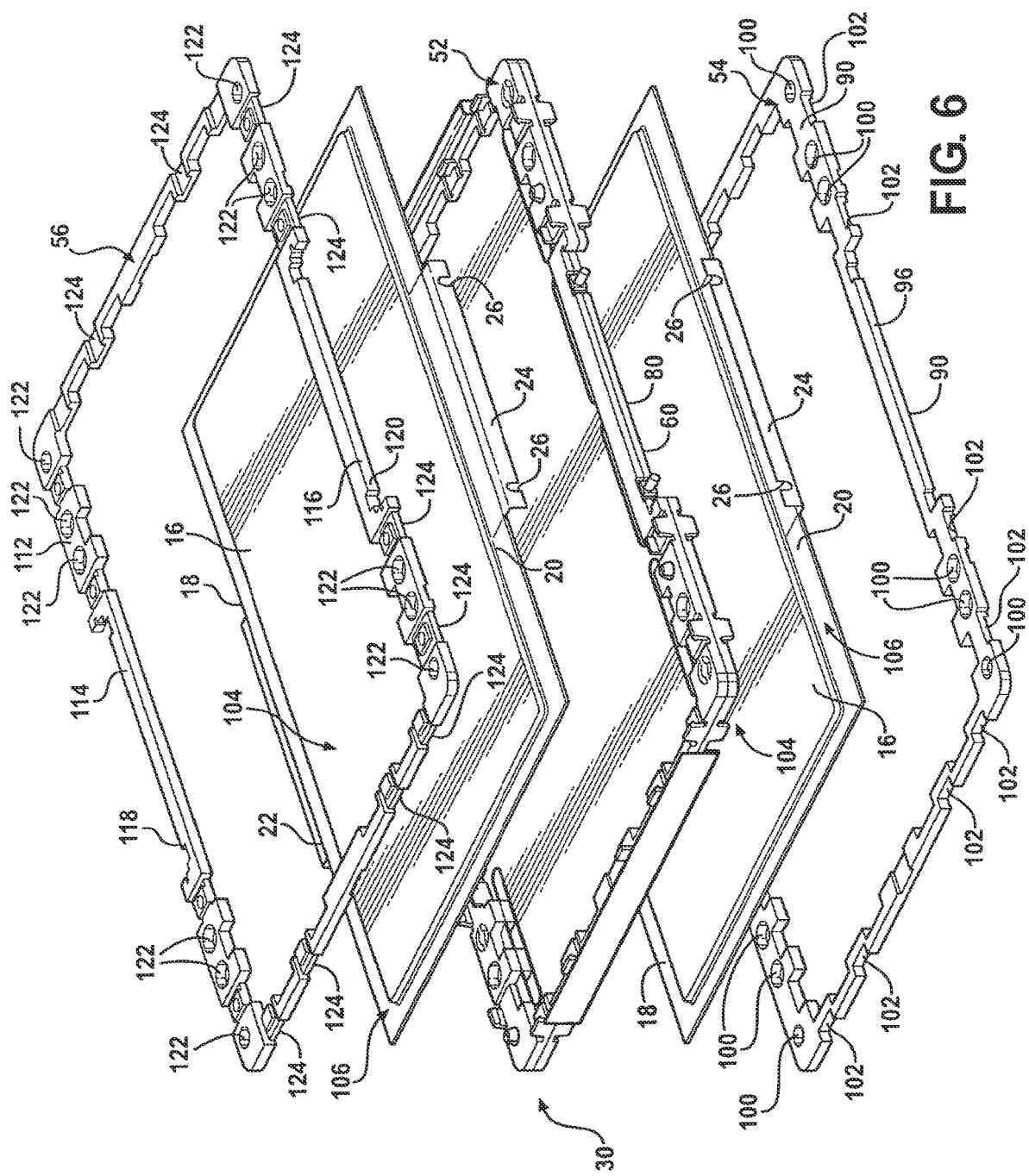
FIG. 6 illustrates an exploded view of the cell retaining element shown in FIG. 5.
Figure 7:
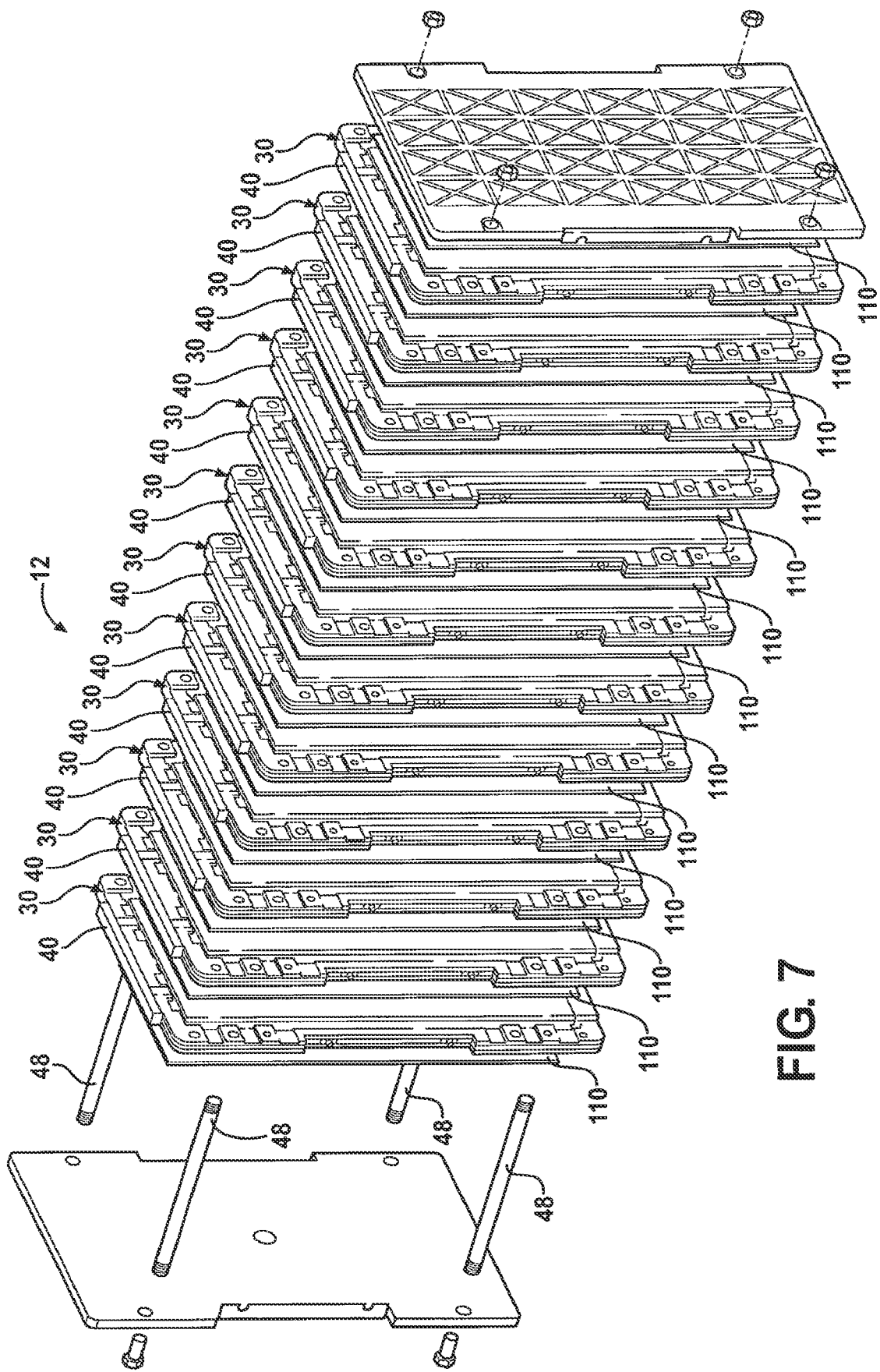
FIG. 7 illustrates a perspective and exploded view of one of the battery module including a plurality of the cell retaining elements.

As best illustrated in FIG. 6, another inner frame 52 presents a configuration similar to the configuration of inner frame 52. The inner frame 52 includes a peripheral edge 80 and side walls 82 and 84. One of the side walls 82 may also includes a pair of pins (not shown) to electro-mechanically engage the bends 22 or 24 of the cells 16. A plurality of holes or female connectors 86 are defined in the frame 52. A plurality of male connectors or hooks 88 are formed and integrally extend from and about the peripheral edge 58 of the frame 50. The hooks 88 extend in the opposite direction and away from the plate 34. A plurality of studs 89 extend from the inner frame 52 in the direction opposite from the hooks 88 to mechanically engage the inner frame 50 and the plate 34 sandwiched therebetween. The frames 50 and 52 are molded from a polymeric material. Those skilled in the art will appreciate that various polymeric materials may be used to form the frames 50 and 52 without limiting the scope of the present invention. The frames 50 and 52 may be partially formed from the polymeric material and have the hooks and studs disposed therein during the molding stage, wherein the hooks and studs may be formed from a non-polymeric material. The molding may be injection molding or cast molding. The materials and methods of formation of the lower frames 50 and 52 are used for exemplary purposes and are not intended to limit the scope of the present invention.

As best shown in FIG. 6, one of the outer frames 54 presents a peripheral edge 90 and side walls 92 and 94 each presenting cut out portions 96 and 98 dimensionally configured to engage the bends 22 and/or 24. A plurality of holes or female connectors 100 are defined in the frame 54. A plurality of female connectors 102 are formed in the peripheral edge 90 to engage the hooks 70 extending from the inner frame 50 in a snap interface to secure one of the prismatic cells 16 therebetween. The outer frame 54 and the inner frame 50 define an opening to surround the raised portions 104 of the cell 16 and sandwiched a peripheral lip portion 106 of the cell 16 therebetween. One of the raised portions 104 of each cell 16 frictionally engaged the plate 34 while the other raised portion 104 frictionally engages the raised portion 104 of another cell 16 retained by adjacent cell retaining element, as best shown in FIG. 7.

Alternatively, as best shown in FIG. 7, a device or a layer of material 110, such as foam or any other non-rigid polymeric materials, is sandwiched between the raised portions 104 of the prismatic cells 16. The device 110 substantially covers the raised portions 104 of the prismatic cell 16. Alternatively, the device 110 is sandwiched between the peripheral lip portion 106 of the cell 16 and the upper frame 54 to mechanically retain the device 110 with the cell retaining element 30. As the cell retaining elements 30 are assembled with one another to form the battery pack 12, the cell 16 of one cell retaining element 30 is placed adjacent the cell 16 of adjacent cell retaining element 30 wherein the device 110 is sandwiched between the prismatic cells 16. As the cell retaining elements 30 are combined to form the battery pack 12, the device 110 allows expansion and contraction of the prismatic cells 16 during typical charge and discharge states therefore causing the cell 16 to maintain intimate contact with the heat sink 34 for efficient thermal transfer inside the battery pack 12 and/or battery assembly 10.

Similarly, the other outer frame 56 presents a peripheral edge 112 and side walls 114 and 116 each presenting cut out portions 118 and 120 dimensionally configured to engage the bends 22 and/or 24. A plurality of holes or female connectors 122 are defined in the frame 56. A plurality of female connectors 124 are formed in the peripheral edge 112 to engage the hooks 88 extending from the inner frame 52 to secure one of the prismatic cells 16 in a snap interface therebetween. The outer frame 56 and the inner frame 52 define an opening to surround the raised portions 104 of another prismatic cell 16 and sandwiched a peripheral lip portion 106 of the prismatic cell 16 therebetween.

One of the raised portions 104 of the prismatic cell 16 frictionally engaged the plate 34 while the other raised portion 104 frictionally engages the raised portion 104 of another cell 16 retained by adjacent cell retaining element, as best shown in FIG. 7. The outer frames 54 and 56 are molded from a polymeric material. Those skilled in the art will appreciate that various polymeric materials may be used to form the frames 54 and 56 without limiting the scope of the present invention. The frames 54 and 56 may be partially formed from the polymeric material and have the hooks and studs disposed therein during the molding stage, wherein the hooks and studs may be formed from a non-polymeric material. The molding may be injection molding or cast molding. The materials and methods of formation of the inner frames 54 and 56 are used for exemplary purposes and are not intended to limit the scope of the present invention.

While the invention has been described as an example embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A battery assembly, comprising:
   a plurality of removably coupled frames, each of the plurality of removably coupled frames including an open central portion;
   a first prismatic cell supported by the plurality of removably coupled frames, the first prismatic cell having a first terminal extending from a first side of the plurality of removably coupled frames and a second terminal extending from a second side of the plurality of removably coupled frames, the second side of the plurality of removably coupled frames different from the first side of the plurality of removably coupled frames; and
   a heatsink secured by the plurality of removably coupled frames and positioned to conduct thermal energy between the first prismatic cell and the heatsink via the open central portion of one of the plurality of removably coupled frames, the heatsink having a first fin extending along a third side of the plurality of removably coupled frames, the third side of the plurality of removably coupled frames different from the first side and the second side of the plurality of removably coupled frames, wherein the first fin extends from a fin base positioned along the third side of the plurality of removably coupled frames to a distal fin end to define a first fin having a tubular cross section.

2. The battery assembly of claim 1, wherein the heatsink completely covers the open central portion of the one of the plurality of removably coupled frames through which thermal energy is conducted between the first prismatic cell and the heatsink.

3. The battery assembly of claim 1, wherein the heatsink contacts the first prismatic cell through the open central portion of the one of the plurality of removably coupled frames.

4. The battery assembly of claim 1, wherein the second side is opposite the first side of the plurality of removably coupled frames.

5. The battery assembly of claim 1, wherein the heatsink further includes a second fin extending along a fourth side of the plurality of removably coupled frames, the fourth side of the plurality of removably coupled frames different from the first side, the second side, and the third side of the plurality of removably coupled frames.

6. The battery assembly of claim 5, wherein the second fin comprises a flat surface.

7. The battery assembly of claim 5, wherein the heatsink comprises a plate formed from at least one thermally conductive material.

8. The battery assembly of claim 1, wherein:
   the plurality of removably coupled frames includes a first frame, a second frame, and a third frame,
   the first prismatic cell is retained intermediate the first frame and the second frame, and
   the heatsink is retained intermediate the second frame and the third frame.

9. The battery assembly of claim 8, wherein the plurality of removably coupled frames further includes a fourth frame, and wherein the battery assembly further comprises a second prismatic cell retained intermediate the third frame and the fourth frame, whereby the heatsink is positioned intermediate the first prismatic cell and the second prismatic cell.

* * * * *